(12) United States Patent
Courtney

(10) Patent No.: US 7,845,603 B2
(45) Date of Patent: Dec. 7, 2010

(54) CABINET LEVELING DEVICE

(76) Inventor: Brooks Barrington Courtney, 6378 Jordan St., North Port, FL (US) 34287

( * ) Notice: Subject to any disclaimer, the term of this patent is extended or adjusted under 35 U.S.C. 154(b) by 0 days.

(21) Appl. No.: 12/378,963

(22) Filed: Feb. 23, 2009

(65) Prior Publication Data

US 2010/0213332 A1    Aug. 26, 2010

(51) Int. Cl.
*F16M 11/24* (2006.01)
(52) U.S. Cl. .................... 248/188.2; 248/678; 248/688; 248/346.03; 248/346.5; 312/228; 108/51.11
(58) Field of Classification Search ............. 108/51.11; 248/688, 678, 346.03, 346.5, 188.2; 312/228
See application file for complete search history.

(56) References Cited

U.S. PATENT DOCUMENTS

| 3,040,391 | A | * | 6/1962 | Saunders | ...................... | 49/425 |
| 4,783,879 | A | * | 11/1988 | Weaver | .......................... | 16/34 |
| 5,687,940 | A | * | 11/1997 | England | .................. | 248/188.2 |
| 5,971,408 | A | * | 10/1999 | Mandel et al. | ............. | 280/43.2 |
| 6,601,806 | B2 | * | 8/2003 | Wing et al. | ............... | 248/188.2 |
| 6,644,628 | B1 | * | 11/2003 | Triche | .......................... | 254/88 |
| 6,840,591 | B2 | * | 1/2005 | Wessel | ....................... | 312/278 |
| 6,871,379 | B2 | * | 3/2005 | Ebeling et al. | ................. | 16/19 |
| 2009/0026333 | A1 | * | 1/2009 | Lenzini | .................... | 248/188.2 |

* cited by examiner

*Primary Examiner*—Terrell Mckinnon
*Assistant Examiner*—Nkeisha J Smith
(74) *Attorney, Agent, or Firm*—Dennis G. LaPointe

(57) ABSTRACT

The inventive concept is directed to a leveling device to level cabinets or other appliances. The device is constructed as an elongated housing having an interior therein. The interior of the housing will receive a movable triangular adjustment lever which is mounted in the housing in such a manner that a bottom flange will protrude from the housing and contact a floor on which the cabinet is to be located. The triangular adjustment lever has an upstanding flange that is contacted by an adjustment bolt which is accessible from the outside of the housing. A leveling device is installed in each of the inside corners of the cabinet and is accessible from a wall in the toe-kick recess of the cabinet by way of a tool through the wall. The leveling devices located in the rear corners of the cabinet are accessible for adjustment by way of on elongated rod passing through the wall and will attach to the respective adjustment bolts.

3 Claims, 2 Drawing Sheets

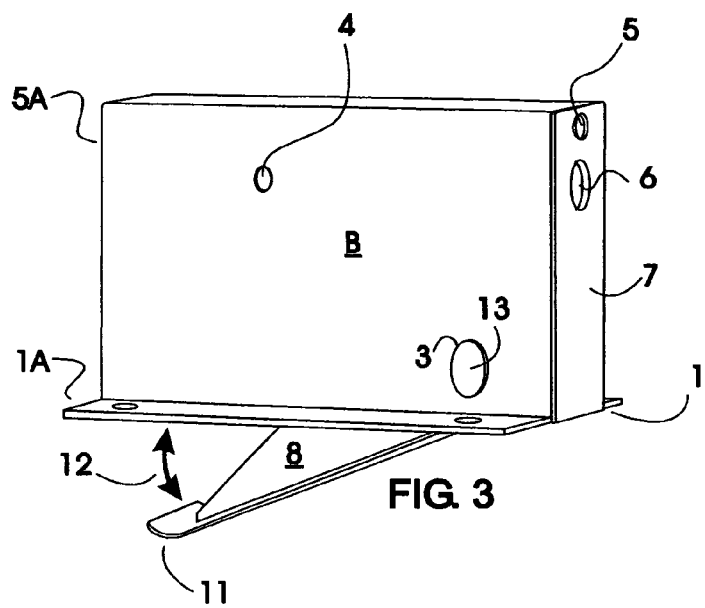
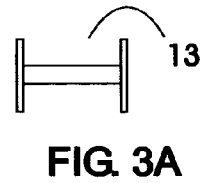
FIG. 3
FIG. 3A
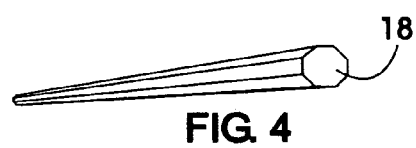
FIG. 4
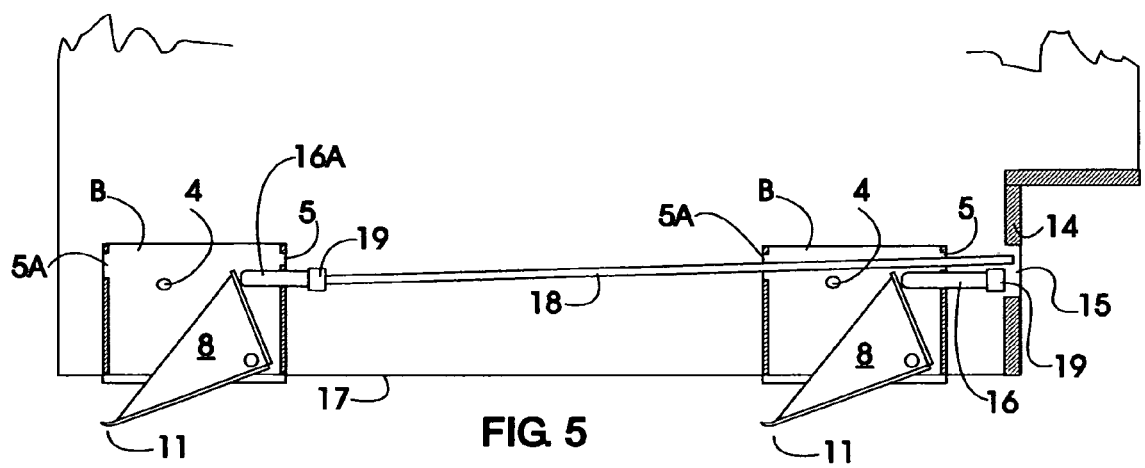
FIG. 5

CABINET LEVELING DEVICE

BACKGROUND OF THE INVENTION

The invention relates to a device for leveling a cabinet, an appliance, a machine or other structure on an uneven floor. In the case of a machine or a cabinet, such as kitchen cabinets, refrigerators, freezers or a cooking range, the structure is often required to stand on an uneven surface. Kitchen cabinets, for example, must be perfectly level and stable. Floors on the other hand are never perfectly level, demanding the installer to use "shims" or other leveling devices. Shims are not stable and are troublesome to install, because of the following: Cabinets are installed side by side and the rear-most shims for each cabinet are hidden by the next cabinet to be set in place. Therefore, in order to make critical fine adjustments, the installer would need to remove some of the cabinets already in place to reach the back-most shims and by doing so must now re-level the cabinets that were removed. This kind of leveling operation is very labor intensive and time consuming. Other leveling devices address this problem with devices that mount in various ways underneath the cabinets and require holes to be drilled through the bottom of the cabinet floor. Holes drilled through the bottom of the cabinet floor are ugly and are not desirable at all. Also, adjusting this type of leveling devices is a slow undertaking because it is difficult to get a tool, such as a screw driver, through the hole and onto the adjustment screw without missing any of the screws altogether.

BRIEF DESCRIPTION OF THE INVENTION

An object of the invention is to provide a cabinet leveling device that enables an installer to level a cabinet from the front of the cabinet through two small holes that are drilled through the wall in the rear of the toe-kick area. This area will be covered after the cabinet installation and, therefore, the two holes will be invisible to the customer. Another objective is that the device may be quickly installed and remain stable during the installation of the cabinet and is easily adjustable by the installer. Four leveling devices are installed underneath and to the inner sides of each of the cabinets. Each device has an adjusting bolt which will extend forward toward the toe-kick area.

BRIEF DESCRIPTION OF THE DRAWINGS

FIG. 3 shows a readily completed leveling device;
FIG. 3A shows a pivot pin;
FIG. 4 illustrates an elongated adjusting rod;
FIG. 5 shows a complete installation of two leveling devices in a cabinet.

DETAILED DESCRIPTION OF THE INVENTION

Figure 1:
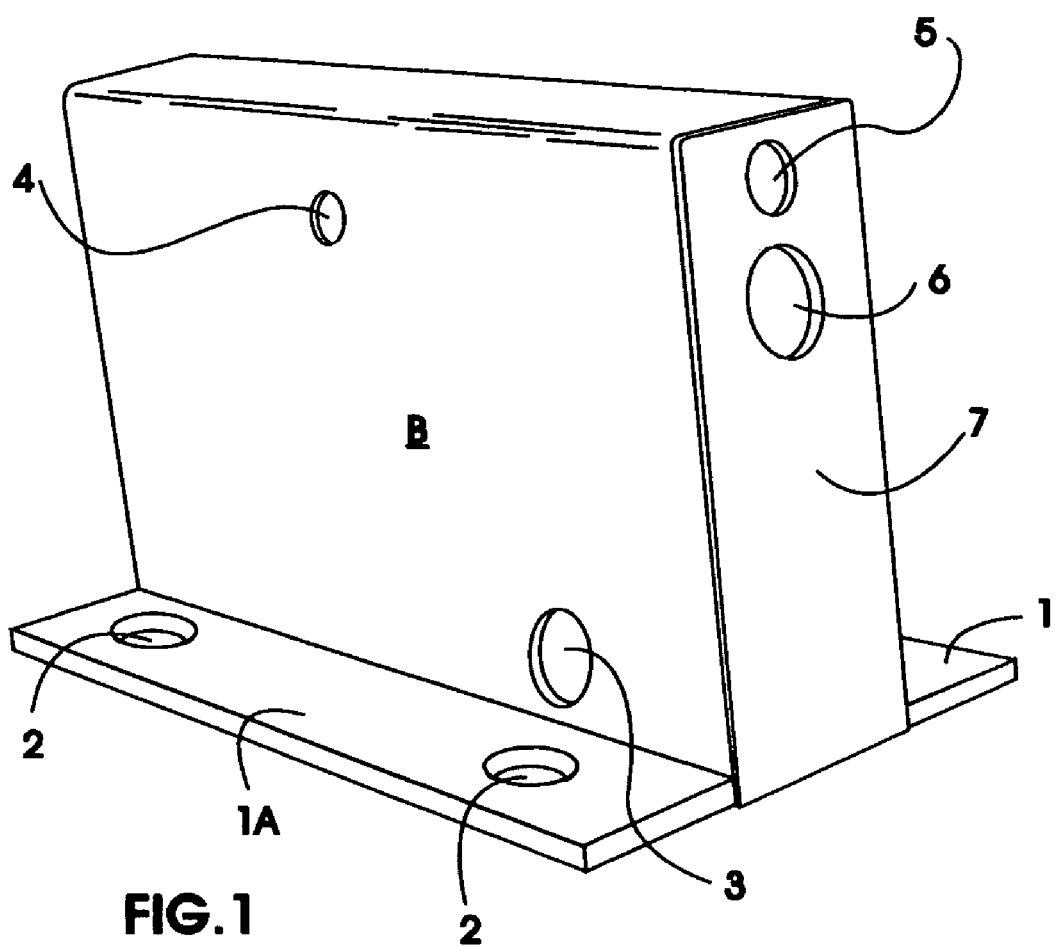
FIG. 1 Is a perspective view of a U-shaped housing bracket.

FIG. 1 illustrates a housing bracket B. This configuration clearly shows that this U-shaped form may be formed from a single sheet of metal by properly forming the various walls. The U-shaped housing could also be formed from a plastic material by a moulding process. There are front and back walls. The front and back walls have flanges 1A on the bottom bent at right angles. The flanges 1A have mounting holes 2 therein for mounting against the underside of the cabinet walls. The back wall has a flange 1, both flanges 1 and 1A are bent at right angle. There are further mounting holes 4 in the front and rear walls of the housing B. Only the front wall 20 is shown. The opening 3 will receive the triangular adjusting lever 8 by way of the hinge pin shown in FIG. 3A. The hinge 13 will pass through the hole.

Figure 2:
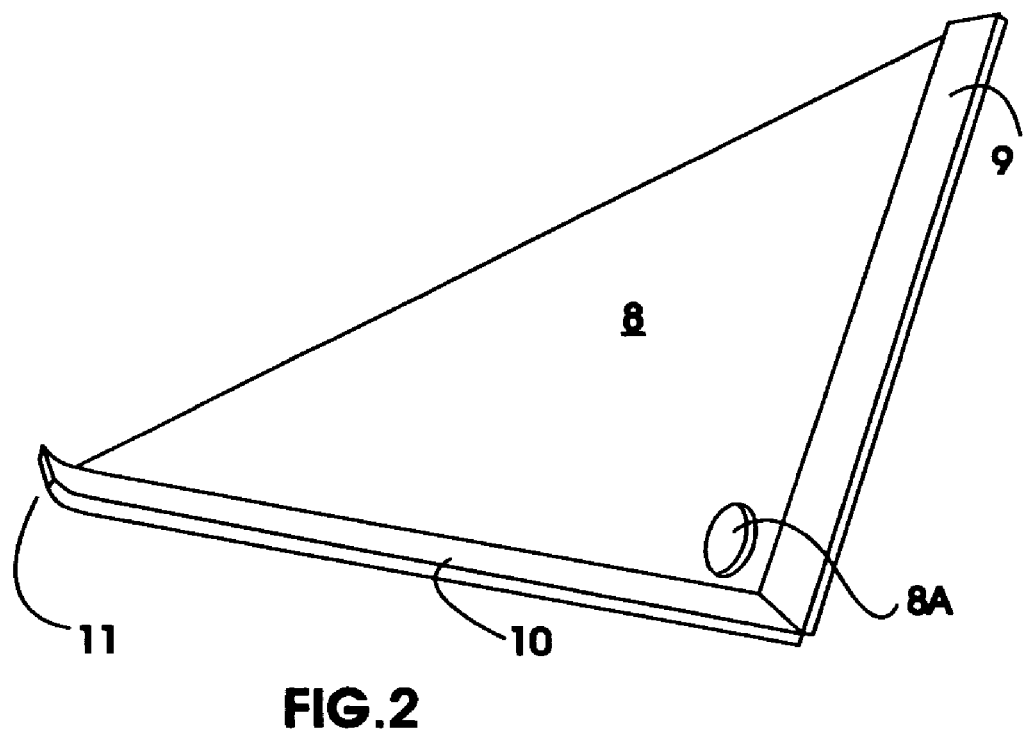
FIG. 2 illustrates a triangular movable adjusting lever.

FIG. 2 shows an adjusting lever 8 in a perspective view. As can be seen from this FIG. 2 that the bracket is of a triangular configuration and a mounting hole 8a is placed in the vicinity of the apex of the triangular form. There are two flanges 9 and 10. The bottom flange 10 has a rounded bump or edge 11 formed thereto which is instrumental in making contact with the surface on which the cabinet is placed. The upstanding flange 9 will be contacted by way of adjusting bolts which will further be explained below.

FIG. 3 illustrates the inventive leveling device in a perspective view. The adjusting lever of FIG. 2 can be seen being movable below the housing B as is shown by the arrow 12. The pivot pin 13 of FIG. 3A can be seen after having been installed in the opening 3. The openings 5 and 6 in this FIG. 3 will be used to gain access to the adjustment bolts 16 and the elongated adjustment rod, explained below. There is an additional opening SA on the other side wall. Only the side wall 7 is shown.

FIG. 3A has been explained above with reference to FIGS. 1 and 2.

FIG. 4 is a perspective view of a long extension adjustment rod 18 which allows a rearwardly located leveling device to be adjusted as the need arises. The circumferential shape of this rod is chosen to conform to tools such as nut drivers or sockets commonly used on mechanical devices.

FIG. 5 shows a completed installation of a cabinet having two leveling devices B installed therein. There is rearward leveling device on the left side and a front leveling device located just behind the toe-kick recess wall 14. This wall 14 will have a hole 15 drilled through it by the installer which serves to allow tools to pass through to gain access to the adjusting bolt 16 and the elongated rod 18. The adjusting bolt 16 is short because it is located directly behind the toe-kick wall 14. The rear level adjusting device also has a short adjusting bolt 16a. All adjusting bolts 16,16a have heads 19 to either receive a male or female driving tool. The rearward leveling device can only be reached by way of an elongated adjustment rod 18 which has an outer contour to be received in the head 19 of the bolt 16a. The other short adjustment bolt 16 also has a head, possibly the same as the head 19 on the bolt 16a to also receive an adjustment tool.

Many variations of the invention will occur to those skilled in the art. Some variations may include longer mounting flanges, or flanges bent in other directions or omitted entirely. Some variations may include size adjustments for to increase or decrease strength. Some variations may include an elongated adjusting lever thereby increasing lifting ratio. Adaptations and variations to fit other applications are intended. All such variations are intended to be within the scope and spirit of the invention.

Although some embodiments are shown to include certain features, the applicant specifically contemplate that any feature disclosed herein may be used together or in combination with any other feature on any embodiment of the invention. It is also contemplated that any feature may be specifically excluded from any embodiment of an invention.

Operation

When a cabinet is to be installed, the leveling devices B are installed in all four corners on the inside of a cabinet. The leveling device B is installed by placing the same on the underside of the cabinet at the bottom wall 17 of the cabinet.

For this purpose, screw holes 2 and 4 are provided. Once all the leveling devices B are installed in the bottom of the cabinet, the elongated adjustment rods 18 and the short bolts 16 are accessible from the inside wall 14 of the toe-kick recess. A bubble level is placed on top of the cabinet surface and by observing the bubble; the long rod 18 or short bolts 16 and 16*a* are turned against the upstanding flange 9 of the adjustment lever 8 until a perfect level is observed.

It should be pointed that the inventive leveling devices can be used in many different applications where leveling is desirable. This could involve refrigerators, washing machines or any other machinery.

What I claim is:

1. A leveling device to be used in leveling cabinets or other appliances, said cabinets or other appliances being located on a floor, said leveling device comprising:
    a U-shaped housing having front and rear walls forming an interior, the front and rear walls having flanges at right angles to said front and rear walls;
    a movable adjusting lever is installed in said interior in such a manner that a bottom edge of said adjusting lever protrudes from a bottom of said housing, wherein said adjusting lever is triangularly shaped and having an apex and a mounting hole located in the vicinity of said apex of said triangularly shaped adjusting lever;
    an adjustment bolt is configured to pass through a side wall of said housing and to apply a force to an upstanding edge of said adjusting lever, wherein when said leveling device is installed in said bottom of said cabinet and said bottom of said adjusting lever contacts a floor beneath said cabinet and said adjustment bolt exerts a force against said upstanding edge of said adjusting lever to lift or lower said cabinet; and an elongated extension rod configured to reach an additional and remote leveling device installed behind and aligned with said leveling device under a rear of said cabinet, said elongated extension rod being insertable though pass-through holes in side walls of said leveling device.

2. The leveling device according to claim 1, wherein said adjustment bolt has a circumferential shape to be accessible and usable by common tools.

3. The leveling device according to claim 1, wherein said adjusting lever further comprises:
    a rounded bump or edge attached to said bottom edge of said adjusting lever wherein said rounded bump or edge of said adjusting lever makes contact with said floor.

* * * * *